(12) United States Patent
Shver (10) Patent No.: US 8,206,642 B2
(45) Date of Patent: Jun. 26, 2012

(54) PIVOTING SLAG DOOR

(75) Inventor: Valery Shver, Tucker, GA (US)

(73) Assignee: Process Technology International, Tucker, GA (US)

( * ) Notice: Subject to any disclaimer, the term of this patent is extended or adjusted under 35 U.S.C. 154(b) by 108 days.

(21) Appl. No.: 12/724,657

(22) Filed: Mar. 16, 2010

(65) Prior Publication Data

US 2011/0227262 A1 Sep. 22, 2011

(51) Int. Cl.
*C21C 5/46* (2006.01)
(52) U.S. Cl. .......... 266/45; 266/272; 432/250; 432/237
(58) Field of Classification Search ............ 266/135, 266/227, 237, 271, 45, 142, 200, 900, 901; 432/250, 237
See application file for complete search history.

(56) References Cited

U.S. PATENT DOCUMENTS

| | | | | |
|---|---|---|---|---|
| 3,871,632 A | * | 3/1975 | Wunsche | 266/200 |
| 4,015,834 A | | 4/1977 | Wunsche | |
| 4,094,496 A | * | 6/1978 | Readal | 266/142 |
| 5,173,243 A | * | 12/1992 | Laszlo | 266/45 |
| 5,904,895 A | * | 5/1999 | Gitman et al. | 266/225 |
| 6,155,765 A | * | 12/2000 | Warnix et al. | 414/192 |
| 6,719,944 B2 | * | 4/2004 | Stercho | 266/44 |
| 2007/0290420 A1 | * | 12/2007 | Wunsche | 266/271 |

FOREIGN PATENT DOCUMENTS

WO 2007147248 12/2007

OTHER PUBLICATIONS

International Search Report and Written Opinion dated Aug. 4, 2011 for related PCT Application No. PCT/US2011/028376.

* cited by examiner

*Primary Examiner* — Scott Kastler
*Assistant Examiner* — Michael Aboagye
(74) *Attorney, Agent, or Firm* — Troutman Sanders, LLC; Robert R. Elliott, Jr.; Benjamin C. Wiles (57) ABSTRACT

A pivoting, liquid cooled slag door for metallurgical furnaces is disclosed. The slag door can pivot from the top using one or more robust mechanisms that enable the door to be moved into and stopped in any position between a closed position and an open position. The slag door can also incorporate wing walls disposed in close proximity to the sides of the slag door. The wing walls can minimize air infiltration into the furnace when the slag door is in an open position. The slag door can be disposed in close proximity to the hearth of the furnace to eliminate problems associate with conventional slag door tunnels. The slag door can be fitted with a furnace apparatus such as a burner or a lance and can be used to provide access to the interior of the furnace and to control the flow of material out of the furnace.

20 Claims, 10 Drawing Sheets

PIVOTING SLAG DOOR

TECHNICAL FIELD

Embodiments of the present invention relate generally to slag doors for metallurgical furnaces, and specifically to a pivoting slag door with improved proximity to the furnace and wing walls to reduce heat loss from the metallurgical furnace during melt cycles.

BACKGROUND

Electric arc furnaces (EAFs) make steel by using an electric arc to melt charges of scrap metal, hot metal, iron based material, or other metal materials placed within the furnace. Modern EAFs may also make steel by melting direct reduced iron ("DRI") combined with the hot metal from a blast furnace. In addition to the electrical energy of the arc, chemical energy can be provided by auxiliary burners using fuel and an oxidizing gas to produce combustion products with a high heat content to assist the arc.

If the EAF is used for melting scrap, the scrap burden is charged by dumping it into the furnace through the roof opening from buckets, which also may include charged carbon and slag forming materials. A similar charging method using a ladle for the hot metal from a blast furnace may be used along with injection of the DRI by a lance to produce the burden. Additionally, these materials can be added through other openings in the furnace.

In the melting phase, the electric arc and burners melt the burden into a molten pool of metal, termed an iron carbon melt, which accumulates at the bottom or hearth of the furnace. Typically, after a flat bath has been formed by melting of all introduced burden, the electric arc furnace enters a refining and/or decarburization phase. In this phase, the metal continues to be heated by the arc until the slag forming materials combine with impurities in the iron carbon melt and rise to the surface as slag.

Before the melt is poured out of the furnace, therefore, it is necessary to remove the slag and impurities from the surface of the melt. It can also be desirable to take samples of the melt to check, among other things, the chemistry of the melt, carbon and oxygen levels, and temperature. Conventionally, this is done by opening a slag door located in the furnace sidewall. Due to their design, however, opening a conventional slag door enables large amounts of heat to radiate from the furnace and significant amounts of cold outside air to infiltrate the furnace shell, resulting in longer melt cycles and higher production costs.

In addition, conventional slag doors are generally mounted some distance away from the sidewall of the furnace and connected thereto with a corridor or tunnel. During the charging and melting cycle, scrap, slag, and other debris can accumulate in the slag door tunnel. To gain access to the melt to deslag or test the melt, therefore, the debris is cleared from the tunnel. This is done by opening the door and using a large ram installed on a truck to push the debris into the melt. The door is then closed and additional time is given for the debris to become molten and incorporated into the melt. The additional time required to melt the debris increases melt cycle times and reduces efficiency.

In addition to the obvious dangers of opening the slag door while the furnace is in operation, pushing debris into the hot melt can present additional dangers. The first, most obvious, danger is the possibility that pushing debris into melt will splash molten metal onto workers and/or equipment causing damage and/or injury. In addition, during operation, the melt pool in the furnace can become stratified. In other words, when fully liquefied, the melt can contain layers of steel with higher concentrations of entrained carbon near the bottom of the melt and layers with higher concentrations of entrained oxygen near the top of the melt. Pushing the debris from the breast of the furnace into the melt can cause these stratified layers to mix quickly causing a violent reaction as the carbon and oxygen combine and release carbon dioxide. This can create a roiling "boil-over" type effect that presents significant danger to workers and equipment.

In addition, some past designs for slag doors have comprised doors hung on side-mounted hinges. After deslagging, a significant portion of the slag can solidify in and around the doorway and tunnel. This slag build-up can make it difficult or impossible to close a side-mounted door completely because the bottom of the slag door drags on the remaining slag. Leaving the slag door open can result in significant heat losses as the EAF's exhaust system draws cool outside air through the slag door and into the furnace.

What is needed, therefore, is a slag door configured to be mounted as close as possible to the sidewall of the EAF. This can reduce or eliminate the tunnel between the slag door and the furnace threshold. This, in turn, eliminates the build-up of slag and debris in the tunnel, which must be cleared prior to deslagging or testing. What is also needed is a door that can be closed and substantially sealed despite the presence of slag and/or other debris on the threshold of the door. It is to such a slag door that embodiments of the present invention are primarily directed.

SUMMARY

A liquid-cooled, top-pivoting slag door with protective wing walls is disclosed. The door can be mounted in close proximity to the sidewall of a metallurgical furnace, such as an electric arc furnace ("EAF"), and thus does not require a connecting hallway or tunnel. The door can pivot from the top using one or more robust pivoting mechanisms, such as for example and not limitation, one or more rack and pinion gearsets, worm drives, or hydraulic cylinders. The door can be moved and stopped in any position between a closed vertical position and an open horizontal position. The door is positioned in close proximity to the sidewall of the furnace eliminating the traditional slag door tunnel.

The door can be flanked by protective wing walls. The wing walls can comprise, for example and not limitation, cast iron plates, graphite plates, and other heat resistant materials. In some embodiments, the wing walls can be liquid-cooled and can be on the same or a different cooling circuit as the slag door. The wing walls can substantially seal against the sides of the slag door to prevent excessive heat loss from, and air infiltration into, the furnace when the door is opened. The wing walls can also act to channel slag into a manageable stream when it is being poured out of the furnace.

The door features a robust pivoting mechanism that enables the door to be opened and stopped in any position between the fully closed position and the fully open position. This can enable the door to be partially opened to, for example, remove slag, take melt samples, or for furnace observation and maintenance. In some embodiments, the slag door can be used to control the flow of slag out of the furnace.

Due to the pivoting design of the door and the wing walls, the door can substantially seal the furnace despite slag or other obstacles on the threshold or breast of the furnace. If sufficient debris exists on the threshold or breast of the furnace to prevent the door from moving to the fully closed position, the bottom of the door can be lowered such that it seals against the debris. The close proximity of the wing walls to the sides of the door can substantially seal the door on the sides. In this manner, the slag door can substantially seal the opening of the furnace, though in a partially open position.

In some embodiments, an extension can be installed on the furnace opening between the sidewall and the door to enable the slag door system to be installed. In some embodiments, the extension can comprise an adapter and one or more side elements and can utilize the existing threshold on the furnace. The extension can enable the straight slag door to be adapted to the round sidewall of the EAF. In some embodiments, the extension can be installed outside the sidewall of the EAF, such that it abuts the outside surface of the sidewall. In other embodiments, the extension can extend into the furnace, such that it is substantially even with the inside surface of the sidewall.

Embodiments of the present invention can also comprise a method for providing the slag door system on a furnace. The method can comprise placing one or more uprights on either side of an opening in the sidewall of the furnace. A pivot can be pivotally coupled to the uprights to provide a mounting point for the slag door. A top edge of the slag door can then be coupled to the pivot. A drive system can be provided to pivot the slag door between a first position and a second position. In some embodiments, the drive system can enable the door to be stopped in any position between the first position and the second position.

Wing walls can be installed such that they are substantially perpendicular to the slag door. The wing walls can be installed such that they substantially abut the sidewall of the furnace. The wing walls can also substantially abut the sides of the slag door. In this manner, the wing walls can substantially seal against the sidewall of the furnace and the sides of the slag door. This can reduce the amount of cold air entering the furnace when the slag door is opened.

Embodiments of the present invention can also comprise a method of using the slag door system. The slag door can be used to control the flow out of the furnace when deslagging the furnace or removing charge from the furnace. In some embodiments, a burner can be mounted in the slag door and can be used after the deslagging process to remove any slag or debris left on the threshold. Clearing the threshold can enable the door to return to the fully closed position.

The foregoing and other objects, features, aspects, and advantages of the present invention will become more apparent from the following detailed description of the present invention when taken in conjunction with the accompanying drawings.

DETAILED DESCRIPTION

Embodiments of the present invention are directed to a top-pivoting, liquid cooled slag door for metallurgical furnaces. The slag door can be flanked on both sides by wing walls. The wing walls can be liquid cooled, refractory, cast iron, graphite, or other heat resistant material and can substantially seal against the vertical sides of the slag door to minimize heat loss from, and air infiltration into, the furnace (i.e., "heat transfer") when the door is open or partially open. The slag door can be positioned in close proximity to the hearth of the furnace, eliminating the conventional connecting tunnel for the slag door.

In some embodiments, the door can be pivoted using a robust pivoting mechanism, such as for example and not limitation, one or more rack and pinion gearsets. The pivoting mechanism can enable the door to be opened and closed efficiently, and can enable the door to be stopped and/or locked in place in many positions between the fully closed position and the fully open position. This can enable the door to be partially opened to remove slag from the furnace, for example, or fully opened to clean and repair the furnace when necessary.

Embodiments of the present invention can be understood more readily by reference to the following detailed description and the examples included herein. Before the embodiments of the present invention are disclosed and described, it is to be understood that this invention is not limited to the embodiments described within this disclosure. Numerous modifications and variations will be apparent to those skilled in the art while remaining within the scope of the invention. It is also to be understood that the terminology used herein is for describing specific embodiments only, and is not intended to be limiting.

Unless otherwise noted, the terms used herein are to be understood according to conventional usage by those of ordinary skill in the relevant art. The materials described hereinafter as making up the various elements of the invention are intended to be illustrative and not restrictive. Many suitable materials that would perform the same or a similar function as the materials described herein are intended to be embraced within the scope of the invention. Such other materials not described herein can include, but are not limited to, materials that are developed after the time of the development of the invention, for example.

Many types of slag doors exist for metallurgical furnaces with a variety of configurations. Conventionally, slag doors have not been particularly efficient in their design, manufacture, or operation. This inefficiency can result from both overly simplistic designs and overly complicated designs.

For instance, some prior slag doors have simply been two side pivoting doors with a latching mechanism in the middle. The doors are generally lined with a refractory material and may be liquid cooled for additional heat resistance. This side pivoting design works well enough for sealing the furnace in the closed position. It generally does not, however, have provisions for safely locking the door in a partially open position. In other words, the door can be locked in the closed position and may be lockable in an open position, but the doors generally cannot be locked in a partially open position to enable deslagging or sampling of the melt while decreasing heat transfer.

Other types of conventional EAF slag doors comprise a door disposed at an angle of approximately between 3 and 5 degrees and mounted in guide channels at the end of the tunnel. The door can be lifted by hydraulic cylinders or hydraulic or electric motors coupled to chains and sprockets. The doors can be liquid cooled or refractory lined for heat resistance. These types of slag doors do not have provisions, however, for safely locking the door in any position—open, closed, or partially open—during operation. Normally, slag doors are fully opened for slag tapping or sampling and fully closed during scrap melting.

These types of doors can also be difficult to close after deslagging is complete. After the slag is poured off the top of the melt pool (i.e., out of the furnace) during the deslagging process, some slag and/or debris inevitably remains on the threshold of the door. If the bottom of the door is mounted such that it is too close to the threshold, for example, it can be difficult or impossible to close the door due to interference with the slag and/or debris built up on the threshold. On the other hand, leaving sufficient space between the bottom of the door and the threshold to prevent this problem results in poor sealing of the furnace when the door is closed.

As mentioned above, the usual solution to this problem is to use a truck, a forklift, or a ram mounted on rails to clear the debris from the threshold and close the door tightly. This operation creates unsafe working conditions and causes unnecessary delays in furnace operation.

Previous efforts to resolve these issues have resulted in overly complicated mechanisms. This can result in a slag door that is excessively heavy, expensive to manufacture, and difficult to maintain. Slag doors have been fitted with, for example, massive, floor-mounted arms adapted to swing the door open. See, e.g., International Patent Application No. WO2006/016201 A1 to Jean, et al. Slag doors have also been fitted with complicated articulating arms to control the path of the door as it opens and closes. See, e.g., Japanese Patent No. 60-194015 to Itsuo, et al. These designs require substantial initial investments and significant maintenance due to their complex nature. Conventional designs also do not provide the ability to control the flow of molten material out of the furnace using a partially open slag door.

What is needed, therefore, is a slag door with a robust and efficient design. The slag door should utilize a stout, dependable mechanism that enables it to be opened and closed quickly and efficiently and to be positioned and/or locked in a variety of positions. The door should also minimize heat losses to the environment and air infiltration into the furnace when the door is open or partially open. The slag door should be positioned in close proximity to, and at the apex of, the hearth of the EAF. The slag door system should enable retrofitting on existing furnaces, as well as installation on new furnaces. It is to such a slag door that embodiments of the present invention are primarily directed.

Figure 1A:
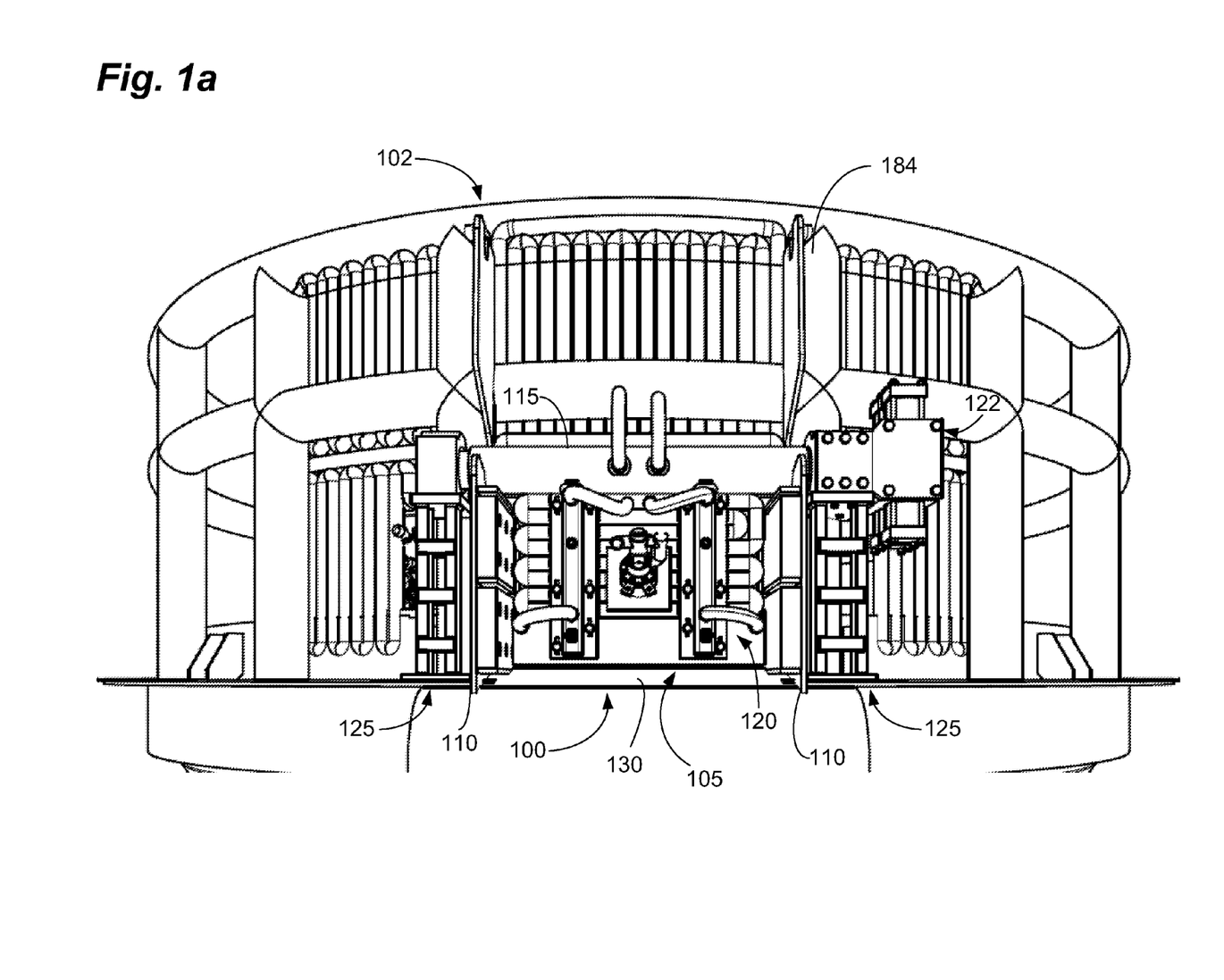
FIG. 1a depicts a front, perspective view of a pivoting slag door system installed on a furnace, in accordance with some embodiments of the present invention.

Referring now to the figures, as shown in FIG. 1a, embodiments of the present invention are directed to a slag door system 100 for a metallurgical furnace 102. The slag door system 100 can comprise a slag door 105, one or more wing walls 110, a pivoting mechanism 115, a cooling system 120, a drive system 122, and a support system 125. The slag door system 100 can be adapted and installed in existing slag door openings and can, for example, utilize the existing threshold 130 of the furnace 102. In other embodiments, the slag door system 100 can be used in the construction of new metallurgical furnaces 102.

Figure 1B:
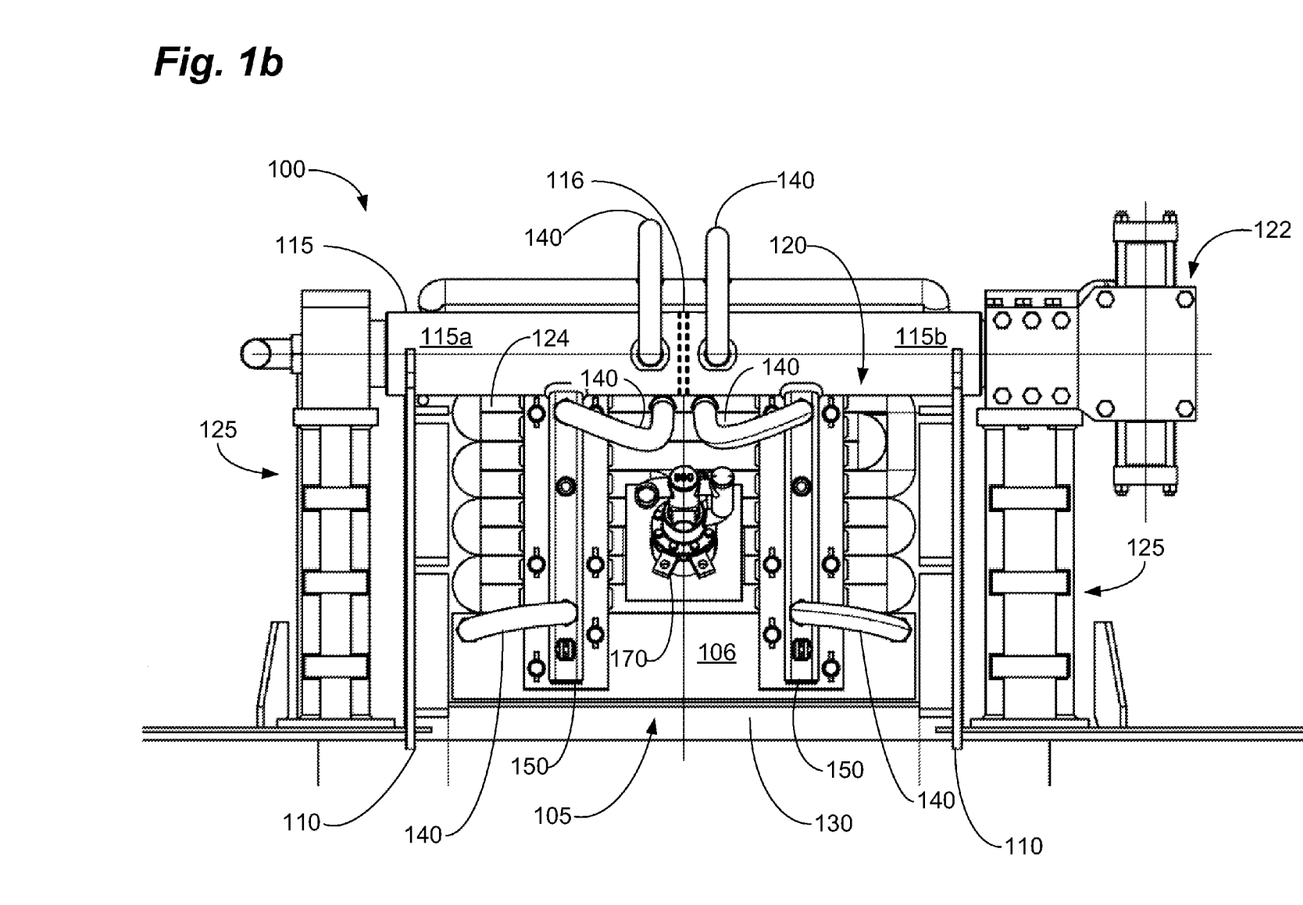
FIG. 1b depicts a detailed front view of the slag door system of FIG. 1a, in accordance with some embodiments of the present invention.

In some embodiments, as shown in FIG. 1b, the slag door 105 can be constructed from steel, or another suitable material, and, in some embodiments, can be clad with a material with a high heat resistance. In an exemplary embodiment, the slag door 105 can be clad on one or both sides with, for example and not limitation, copper. In some embodiments, the slag door 105 can comprise a one or more separate panels to enable damaged panels to be replaced separately.

The system can comprise a cooling system 120. The slag door 105 can have multiple coolant passages 124 to provide cooling for the slag door 105 during furnace operation. In some embodiments, cooling water can flow through the pivot 115 to supply cooling water to the slag door 105 via one or more cooling system hoses 140, and can return heated water from the slag door 105 through one or more cooling system hoses 140. The pivot 115 can further comprise one or more internal compartments to enable supply water to be segregated from return water. For instance the pivot 115 can have a central bulkhead 116 (denoted by the dashed lines), which divides the interior portion of the pivot 115 substantially in half. In this way, cooling water can flow into a first side 115a of the pivot 115, circulate through and cool the slag door 105, and return via a second side 115b of the pivot 115. Of course, the direction of the flow of water is immaterial, and other flow patterns are contemplated.

In some embodiments, the slag door 105 can further comprise door spars 150 which can reinforce and stiffen the slag door 105. The door spars 150 can be in fluid communication with the pivot 115. In some embodiments, one of the door spars 150 can act as a cooling water supply manifold from the pivot 115 to the slag door 105 via one or more cooling system hoses 140. The other door spar 150 can act as a water return manifold and return hot water from the slag door 105 to the pivot 115 for cooling, recycling, or disposal, as necessary. Again, the exact flow pattern for the cooling system is immaterial to embodiments of the present invention, and other flow patterns are contemplated.

Cooling water can be distributed to coolant passages 124 in the slag door 105 via the one or more cooling system hoses 140. In some embodiments, the cooling system hoses 140 can comprise a suitably heat resistant material such as, for example and not limitation, stainless steel braided lines, silicone, or Viton® lines. The cooling system hoses 140 can provide sufficiently flexible connections between the pivot 115 and the fixed points on the furnace, such as the wing walls 110 and support system 125, to enable the slag door 105 to be opened and closed.

In some embodiments, the coolant passages 124 can be internal to the structure of the slag door 105 and can cool the surfaces of the slag door 105. In some embodiments, the coolant passages 124 can have a serpentine pattern and can cover a substantial portion of the surface of the slag door 105. In other embodiments, the pattern for the coolant passages 124 can be altered to meet the needs of specific furnaces 102. The coolant passages 124 can, in some instances, be cast into the structure of the slag door 105. In some embodiments, the slag door 105 can be built up from component parts such that the coolant passages 124 comprise pipes fitted inside the shell of the slag door 105. After flowing through the slag door 105, the coolant can return through cooling system hoses 140 to the door spar 150 and then into the return portion of the pivot 115 (e.g., the first side 115a or the second side 115b of the pivot 115).

In some embodiments, the slag door system 100 can simply have a coolant reservoir with sufficient capacity to meet the cooling needs of the slag door system 100. In some embodiments, the coolant can exit the slag door 105 via the second side 115b of the pivot 115 and can be cooled using a suitable method, such as a heat exchanger, and returned to the slag door 105 via the first side 115a to form a closed loop cooling system. In a preferred embodiment, the coolant can be cooled using a cooling tower. The cooling system 120 can also be used to produce hot water or steam for use in other processes. A variety of suitable sources for cooling water are available and other configurations are contemplated.

The slag door system 100 can further comprise one or more wing walls 110. The wing walls 110 can be connected to a stand-alone cooling system or can be connected to the same cooling system 120 as the slag door 105 and can be in fluid communication with the one or more cooling system hoses 140 on the slag door 105. Similar to the slag door 105, the wing walls 110 can comprise one or more coolant passages (not shown) to provide cooling for the wing walls 110. In other embodiments, the wing walls 110 can be on a separate cooling system.

The cooling demands for the wing walls 110 can vary dramatically depending on, among other things, the amount of time the slag door 105 is open, the temperature of the interior of the furnace 102, and the current furnace cycle. In some embodiments, therefore, the slag door system 100 can utilize a thermostatic valve, or other means, to regulate the flow of coolant through the wing walls 110. So, for instance, when the slag door 105 is closed, coolant flow can be reduced to the wing walls 110 because a substantial portion of the wing wall 110 is protected from the heat of the furnace 102 by the slag door 105. When the slag door 105 is partially open or completely open, on the other hand, coolant flow to the wing walls 110 can be increased. This can enable the size of the cooling system 120 to be reduced somewhat by tailoring coolant flow to cooling demand.

The wing walls 110 can be positioned such that they substantially abut the vertical sides of the slag door 105 and the furnace opening. The wing walls 110 can be touching, or can be disposed in close proximity to the sides slag door 105. The exact distance between the wing walls 110 and the slag door 105 can vary depending on, among other things, the size of the furnace and the installation location. Regardless of the position of the slag door 105, however, the wing walls 110 can be disposed in sufficiently close proximity to the sides of the slag door 105 to greatly reduce air infiltration into, and heat loss from, the furnace. In other words, when the slag door 105 is open, or partially open, the wing walls 110 occupy the gap between the slag door 105 and the sidewall of the furnace 102.

Figure 2A:
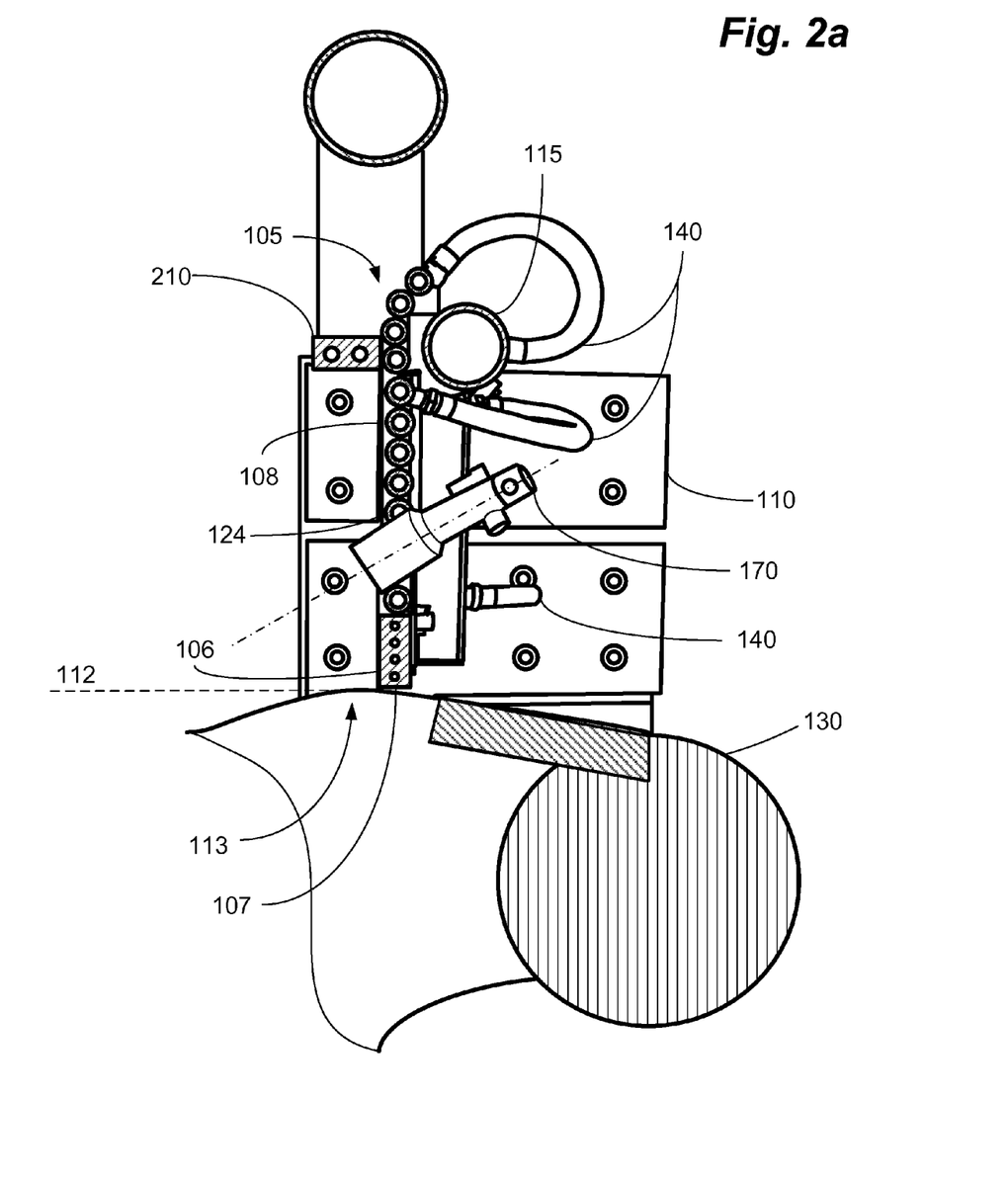
FIG. 2a depicts a cross-sectional view of the slag door system of FIG. 1a in a closed position, in accordance with some embodiments of the present invention.

As shown in FIG. 2a, when the slag door 105 is in the closed position, the slag door 105 can substantially seal (i.e., slight gaps may exist) against the threshold 130, the top of the door frame 210, and the wing walls 110 on either side. In some embodiments, the upper portion 108 of the slag door 105 can comprise multiple cooling pipes, similar in construction to the sidewall of the furnace 102, while the lower portion 106 of the slag door 105 can be, for example and not limitation, a water cooled copper or cast iron block with multiple cooling passages 107. In some embodiments, the block 106 can comprise a material with a high heat transfer coefficient, such as for example and not limitation, copper, aluminum-bronze, or bronze. Additionally, the block 106 can have multiple coolant passages 107 to provide extra cooling. In an alternative embodiment, the block 106 can comprise heat resistant inserts comprising, for example and not limitation, graphite, or other refractory material.

In use, if the slag level is higher than the sill 112 of the furnace 102 (i.e., the highest point of the breast 113 of the furnace), the bottom portion 106 of the slag door 105 can retain the slag inside the furnace 102. The bottom portion 106 of the slag door 105 can have sufficient heat resistance, provided by its material and/or sufficient heat transfer through cooling passages 107, to withstand the heat from the slag. In an exemplary embodiment, the bottom portion 106 of the slag door 105 can be replaceable to minimize maintenance costs.

Figure 2B:
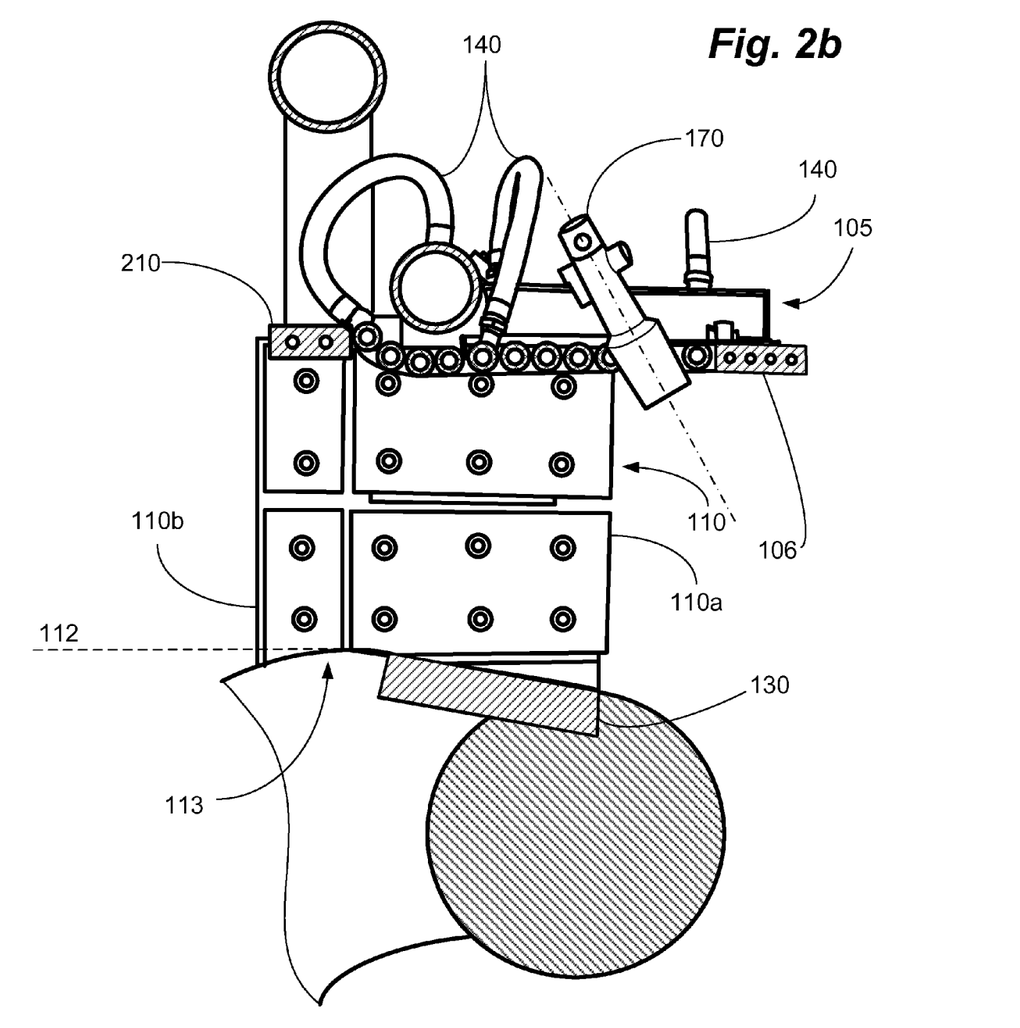
FIG. 2b depicts a cross-sectional view of the slag door system of FIG. 1a in an open position, in accordance with some embodiments of the present invention.

As shown in FIG. 2b, in the open position, the sides of the slag door 105 can substantially abut the wing walls 110 and the top of the door can substantially seal against the top of the door frame 210. The completely open position is primarily used for maintenance and observation of the furnace 102 when the furnace 102 is in the power off mode. When the furnace 102 is powered off, workers can place the slag door 105 in the open position to inspect the furnace 102 and equipment in the furnace and to perform maintenance and cleaning as necessary.

Figure 2C:
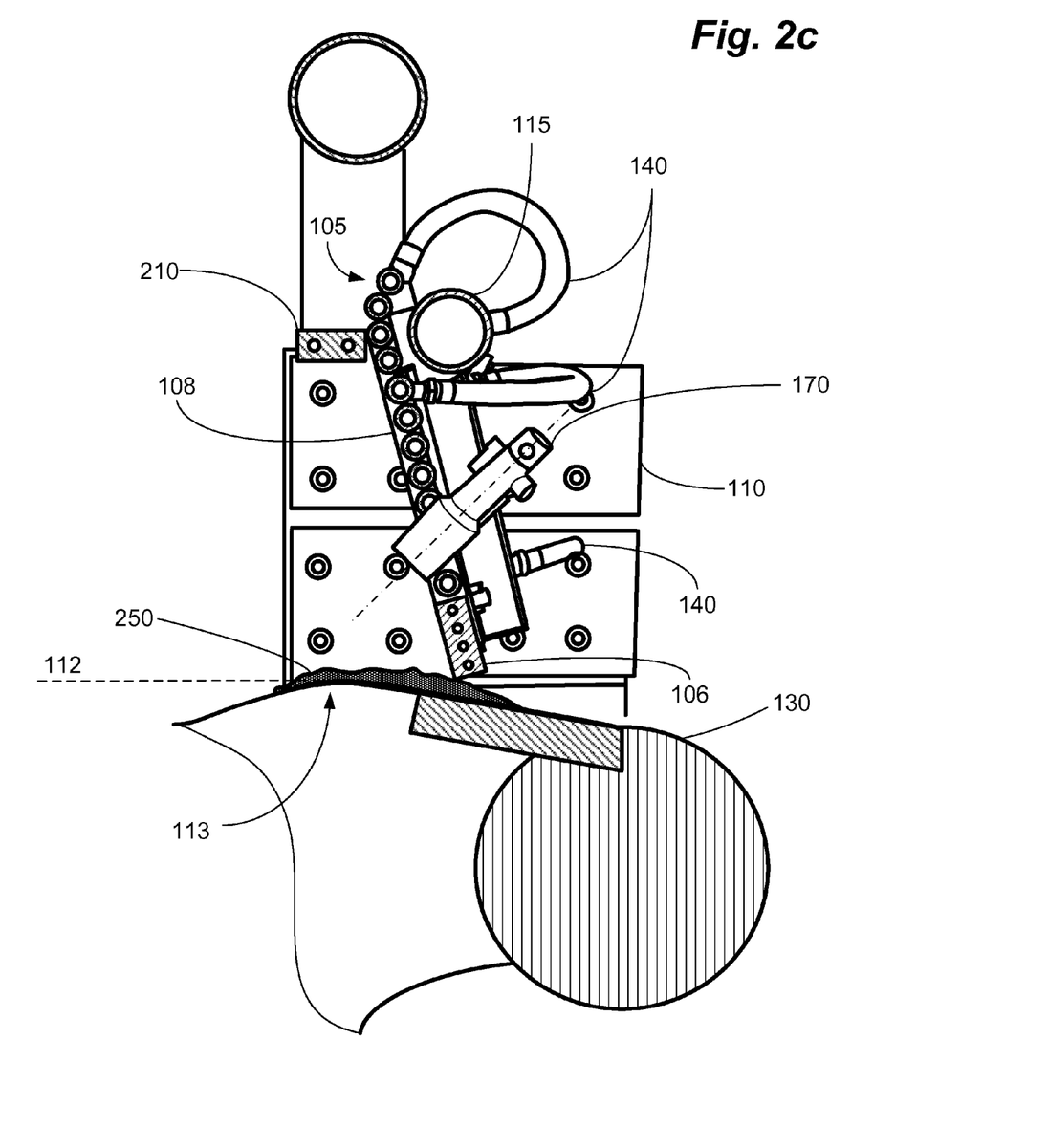
FIG. 2c depicts a cross-sectional view of the slag door system of FIG. 1a closed and sealed against debris on the door threshold, in accordance with some embodiments of the present invention.

As shown in FIG. 2c, the design of the slag door 105 enables the door to be closed and largely sealed even when there is debris 250 on the breast 113 or threshold 130 of the furnace 102. If the debris 250 cannot be removed prior to closing the slag door 105, the slag door 105 can simply be closed until the bottom 106 of the slag door 105 contacts the debris 250. The triangular gap created between the sides of the slag door 105 and the furnace 102 is occupied by the wing walls 110, while the bottom 106 is lowered until it touches the debris 250 itself. This leaves only a small gap between the bottom of the slag door 105 and the breast 113 of the furnace due to the debris 250. In this manner, the furnace 102 can be essentially sealed though the slag door 105 is in a partially open position.

Figure 3A:
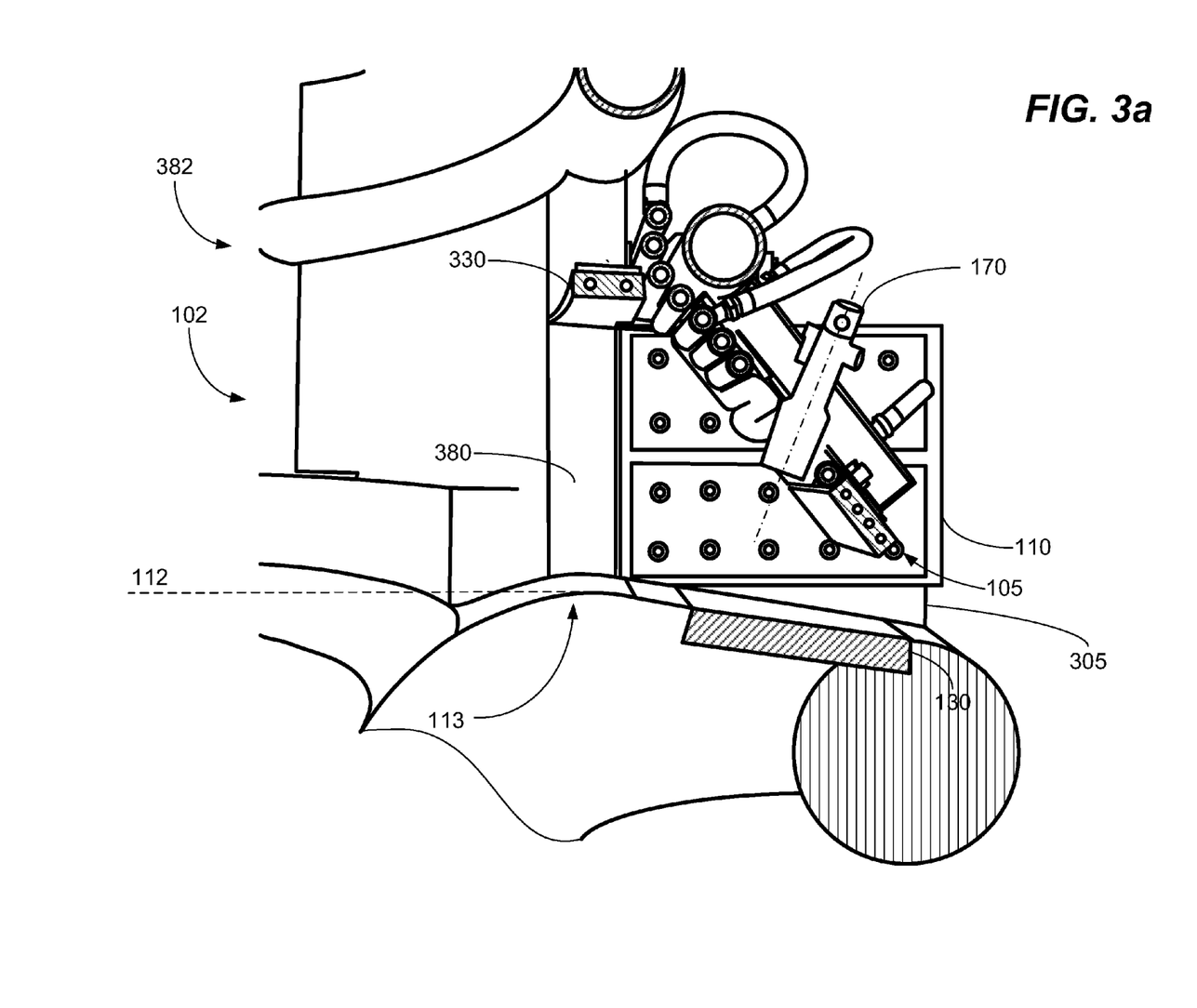
FIG. 3a depicts a cross-sectional view of the slag door system of FIG. 1a in a partially open position, in accordance with some embodiments of the present invention.

As shown in FIG. 3a, when the slag door 105 is in a partially open position, the wing walls 110 minimize the size of the opening created between the sides of the slag door 105 and the furnace 102. In this manner, it is possible to partially open the slag door 105 to, for example and not limitation, remove slag, add chemicals, or take samples of the melt, without excessive air infiltration into, or heat transfer from, the furnace 102. This can reduce heat loss from outside air being pulled into the furnace 102 by the furnace exhaust system, for example, through the open slag door 105. Reducing heat losses increases furnace efficiency and reduces the time required to finish the melt after the slag door 105 is closed. The ability to partially open the slag door 105 also reduces the exposure of furnace operators to excessive heat and dangerous popping or splashing from the melt, improving safety. As discussed below, the partially open slag door 105 can also be used to control the flow of material (e.g., slag) out of the furnace during deslagging.

In some embodiments, the wing walls 110 may only abut the portion of the slag door 105 closest to the furnace 102. In other embodiments, the wing walls 110 may be extended to cover substantially the entire side of the slag door 105, regardless of the door's position. In some embodiments, the bottom 305 of the wing wall 110 can be contoured to substantially follow the contour of the outer threshold 130 of the furnace 102. In this manner, the wing walls 110 can direct slag as it is poured out of the furnace 102 during deslagging, channeling it into the desired container, such as a slag pot, and can prevent excessive splashing and spilling.

In some embodiments, the slag door 105 can also be used to control the flow of slag out of the furnace 102 during the deslagging process. If, for example, the level of the slag in the furnace 102 is above the sill 112 of the furnace 102, the slag door 105 can be partially opened to produce a gap smaller than the level of the slag to control flow out of the furnace 102. The flow rate of the slag out of the furnace 102 is controlled by the size of the opening in the sidewall 380 in the furnace 102, which, in turn is controlled by the position of the slag door 105. In other words, the distance from the bottom of the slag door 105 to the breast 113 and to the wing walls 110 can define the size of the opening and, thereby, define the flow rate of the slag out of the furnace 102. Similarly, when the level of the melt is below the threshold 130 of the furnace, the slag door 105 coupled with the tilt angle of the furnace 102 can be used to control the flow out of the furnace 102 during deslagging.

In some embodiments, a portion of the wing walls 110 can be covered in a material with high heat transfer coefficient, such as for example, copper. The use of such a material can maintain a relatively low temperature on the surface of the wing walls 110. In this way, during deslagging, when slag splashes against the wing walls 110, it is rapidly cooled, which tends to prevent sticking and can make the slag or molten metal brittle and more easily removed. In some embodiments, this material can be used only on the lower portion of the wing walls (i.e., the portion more exposed to slag and molten metal poured out of the furnace) to reduce cost.

In some embodiments, a portion or all of the wing walls 110 can be covered in a material with a high heat resistance coefficient. The wing walls 110 can comprise, for example and not limitation, graphite, cast iron, or a non-sticky refractory. This can enable slag to be more easily removed from the wing walls 110 and the edges of the slag door 105.

In some embodiments, the slag door 105 can further comprise a furnace apparatus 170. The furnace apparatus 170 can be, for example and not limitation, a burner, a lance (e.g., an oxygen lance), a chemical or particle injector, or a combination thereof. In the closed position, apparatus 170 can be used, for example and not limitation, to add thermal energy (burner), to decarburize (oxygen lance), or to add chemicals or recarburize (chemical injector) the melt. Mounting the furnace apparatus 170 in the slag door 105 can be useful, particularly for a burner 170, as the slag door 105 can cause some heat loss when compared to the furnace wall even when closed and obviously causes substantial heat loss when opened (though substantially less than previous designs). The furnace apparatus 170 can be disposed in the door at an angle, such that the ejection angle of the furnace apparatus clears the sill 112 of the furnace 102. In some embodiments, the furnace apparatus 170 can be disposed at an angle of between approximately 10 and 60 degrees from horizontal.

Additionally, a burner 170 can be used to clean scrap away from the slag door 105. The furnace 102 is generally charged with scrap from the top and, as a result, portions of the charge can come to rest leaning against the slag door 105. A burner 170 disposed in the slag door 105 can be used to melt the scrap away from the front of the slag door 105, while simultaneously adding chemical energy to the melt.

In some embodiments, the furnace apparatus 170 can also be functional when the slag door 105 is in a partially open or open position. In the case of a burner 170, this can be useful to maintain the flow of slag out of the furnace 102 with the addition of heat to make the slag more liquid. The burner 170 can also be used with the slag door 105 in the partially open position to clean any remaining slag and/or debris off the threshold of the slag door 105 to aid in closing and sealing the slag door 105 at the bottom. Because the slag door 105 is positioned substantially at the apex of the sill 112 of the furnace 102, any remaining slag tends to run into or out of the furnace 102 when heated. This reduces the amount of slag and debris that accumulates in the path of motion for the slag door 105.

Figure 3B:
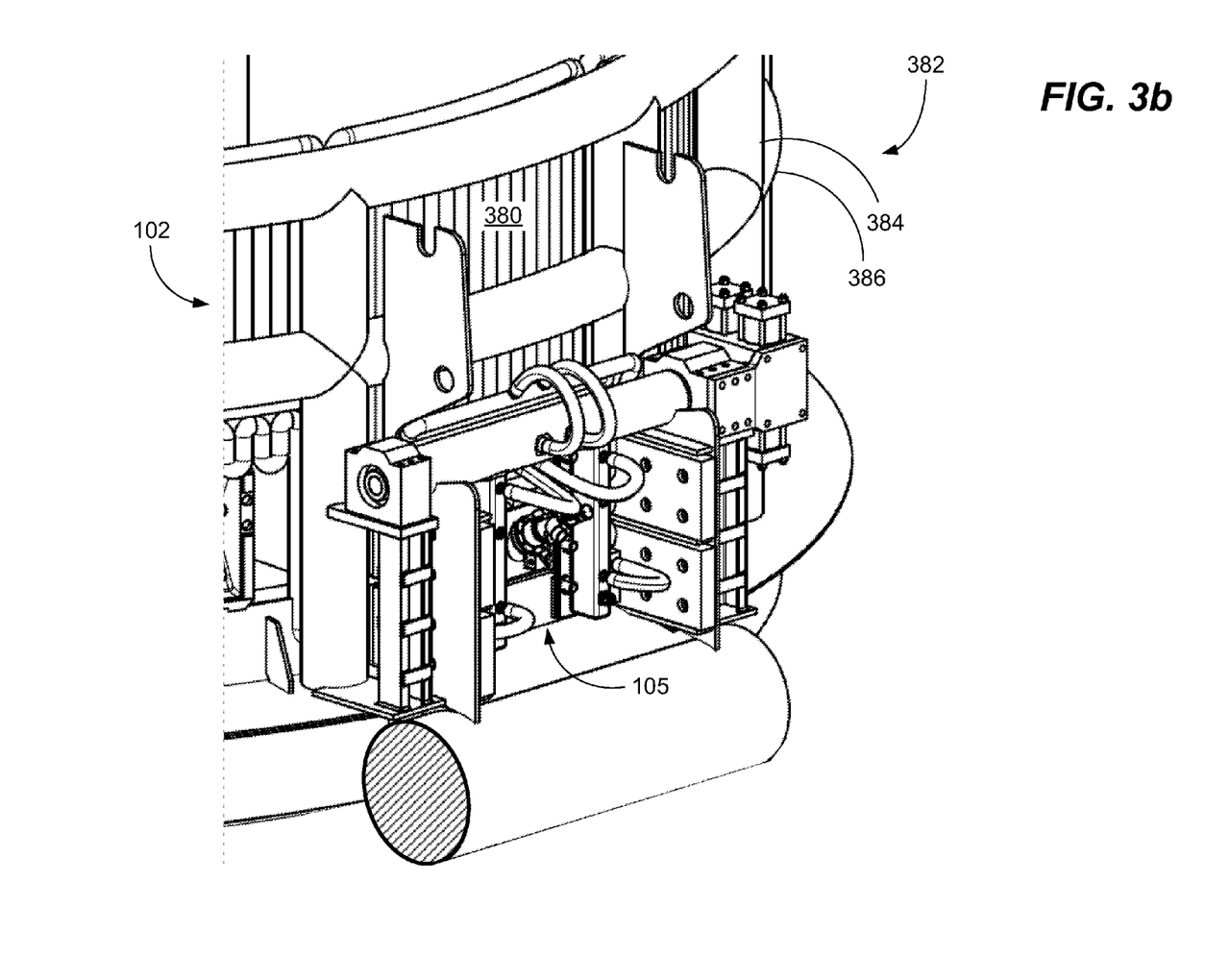
FIG. 3b depicts a perspective, side view of the slag door system of FIG. 1a installed on a furnace, in accordance with some embodiments of the present invention.

As shown in FIG. 3b, metallurgical furnaces 102 are generally round and are constructed with water cooled walls 380 supported by an outer superstructure 382. The superstructure 382 can comprise a series of columns 384 and one or more ring-shaped water headers 386 disposed on the outside of the sidewall 380. In some configurations, therefore, it can be difficult to install the substantially straight slag door 105 and associated mechanisms, against the round sidewall 380 of the furnace 102.

Figure 3C:
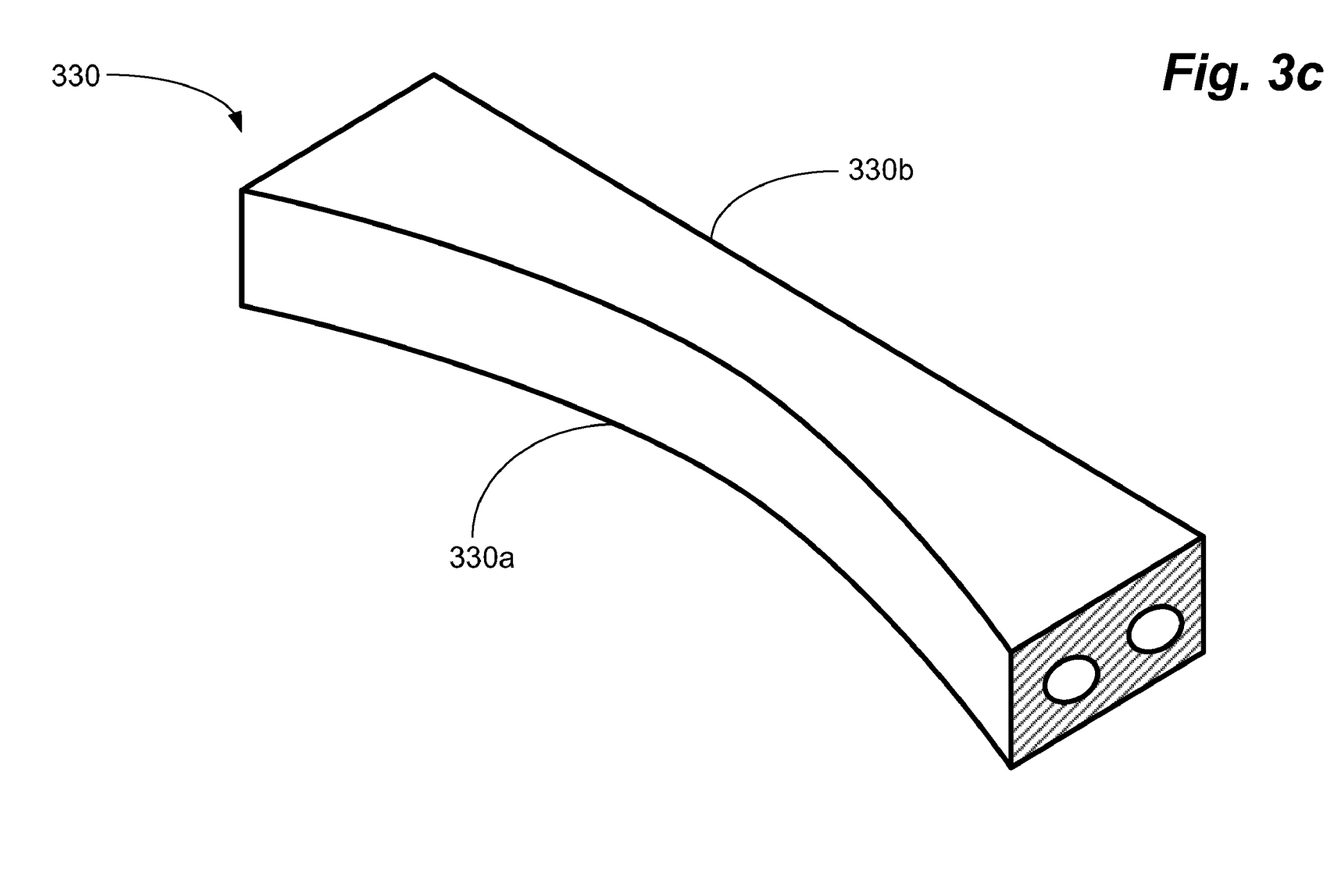
FIG. 3c depicts a perspective, side view of an adapter for installing the slag door system of FIG. 1a, in accordance with some embodiments of the present invention.

As shown in FIG. 3a and in greater detail in FIG. 3c, to seal the slag door 105 against the sidewall 380, the upper door frame 210 can comprise an adapter 330 to transition between the slag door system 100 and the sidewall 380 of the furnace 102. The adapter 330 can substantially match the curve of the outside of the sidewall 380 on one side 330a and be straight on the other side 330b. In this manner the substantially straight slag door 105 can be sealed to the curved sidewall 380 of the furnace. The adapter 330 can be liquid cooled or refractory and can be, for example and not limitation, welded or bolted in place.

In some embodiments, the wing walls 110 can abut the outside of the sidewall 380 of the furnace 102 and can be installed flush with or slightly outside the door opening. In this configuration, the sidewall 380 of the furnace forms the sides of the door opening. The opening can be formed by cutting an opening in the sidewall 380 of the furnace 102 for the slag door 105 opening and resealing the cooling pipes of the sidewall 380 as necessary. In an alternative embodiment, an entire sidewall 380 cooling panel in the desired location can be removed and a custom cooling panel fabricated with the desired opening for the slag door 105.

In other embodiments, as shown in FIGS. 2a-2c, the wing walls 110 can extend partially into the furnace 102, such that the wing walls 110 are substantially flush with the inside of the furnace sidewalls 380. As shown in FIG. 2b, in some embodiments, the wing walls 110 can comprise a main panel 110a and an extension panel 110b. As shown in FIG. 2c, the wing wall 110 can be a unitary panel positioned flush with the inside of the sidewall 380 of the furnace 102. In this configuration, the wing walls 110 can require substantially more cooling capacity because the wing walls 110 are directly exposed to the interior of the furnace 102, but this can ease installation in some furnace 102 configurations.

Figure 4:
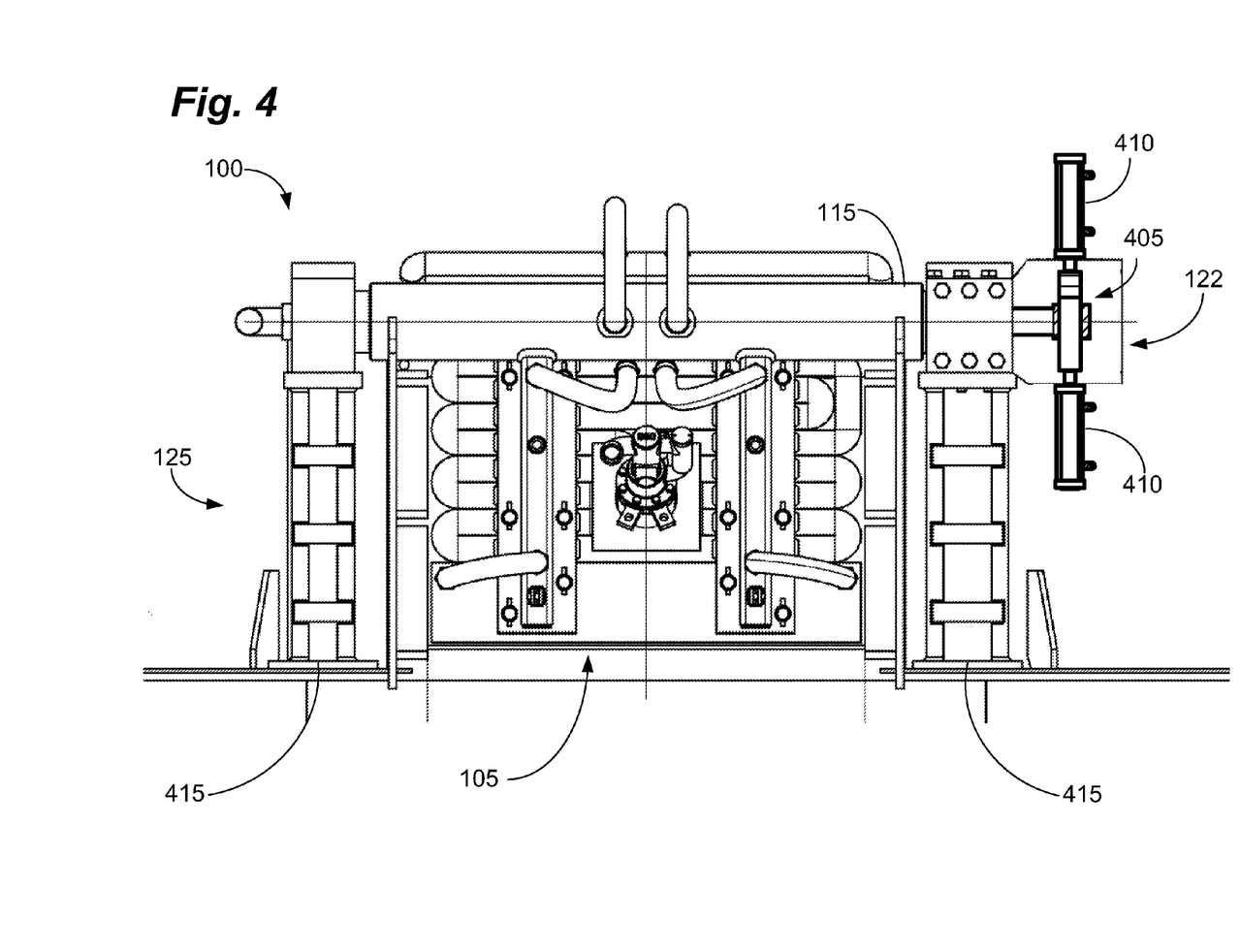
FIG. 4 depicts a front view of the slag door system of FIG. 1a including an embodiment of the drive system, in accordance with some embodiments of the present invention.

As shown in FIG. 4, in some embodiments, the slag door system 100 can further comprise a drive system 122. The drive system 122 can provide a means for pivoting the slag door 105 between a first, closed position (pictured) and a second open position. The drive system 122 can also enable the slag door 105 to be stopped and/or locked in many positions between the first and second position. In this manner, the slag door 105 can be stopped at a variety of angles between the first position and the second position.

Figure 5:
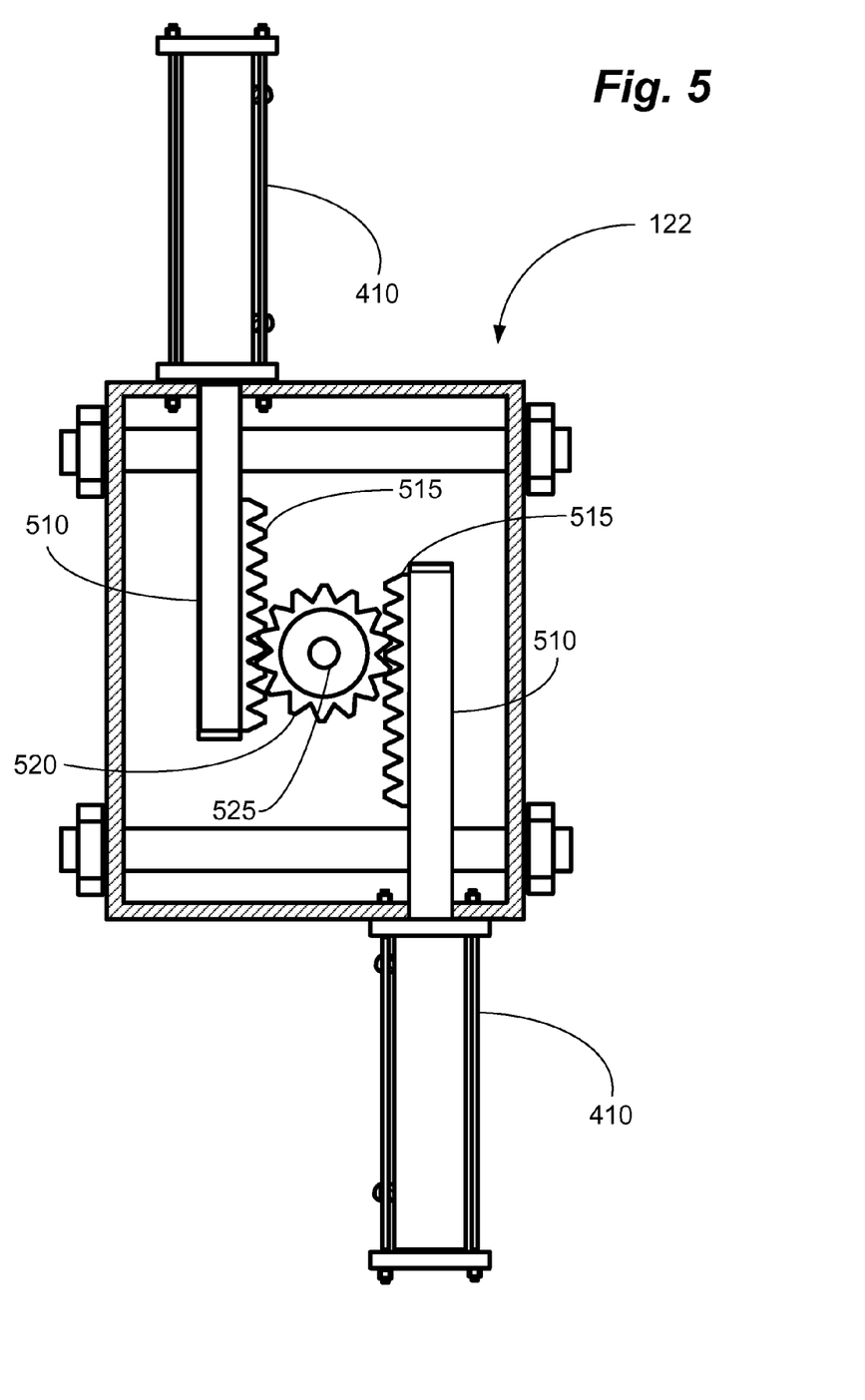
FIG. 5 depicts a cross-sectional, side view of the embodiment of the drive system of FIG. 4, in accordance with some embodiments of the present invention.

In a preferred embodiment, shown in FIGS. 4 and 5, the drive system 122 can comprise one or more hydraulic cylinders 410 fitted with a rack and pinion gear set 405. In some embodiments, the rack 515 portion of the gear set 405 can be detachably coupled to the piston rod 510 of the hydraulic cylinder 410. The pinion gear 520 can be coupled to the pivot shaft 525 of the slag door 105. In this configuration, the piston rods 510 act counter to one another (i.e., to move the door in one direction, one piston is extending while the other is retracting). The drive system 122 provides redundancy, as both hydraulic cylinders 410 would have to fail to render the drive system 122 inoperative and/or for the slag door 105 to swing closed from an open position. This improves the safety of the slag door system 100 and prevents unintended slag door 105 movement due to system failures.

In some embodiments, both hydraulic cylinders 410 can be fitted with counter-balance valves. Counter-balance valves, also called load holding valves, can be located between a directional control valve and the outlet of the hydraulic cylinder 410. In some embodiments, the counter-balance valve can be located on the hydraulic cylinders 410 on the inlet and outlet connections for the hydraulic fluid. The counter-balance valve serves as hydraulic resistance to the hydraulic cylinder 410, enabling it to support the weight of the slag door 105 or to be held in position. The counter-balance valve can be mounted internally or externally to the hydraulic cylinder 410. The counter balance valve can enable the hydraulic cylinders 410 to substantially lock the slag door in any position between and including the open position and the closed position. The system 100 can comprise a stand alone hydraulic system or can tap into existing hydraulic systems on the furnace 102.

In other embodiments, the drive system 122 can comprise an electric or hydraulic motor connected to the pivot shaft 525 with a suitable reduction gear drive. In some embodiments, the drive motors and gearsets can be disposed on each side of the pivot 115. The motors can be reversible to enable the drive system 122 to open and close the slag door 105. In some embodiments, the drive system 122 can be stopped and/or locked in the first position and the second position and many positions between the first position and the second position. This can enable the slag door 105 to be partially opened to enable access to the furnace 102, while reducing heat transfer. This can also prevent scrap or debris from knocking the slag door 105 open during the charging or melting process.

In some embodiments, the slag door 105 can not only be stopped in a variety of positions, but can also be mechanically (as opposed to hydraulically) locked in those positions. Locking can be achieved, for example and not limitation, using a pawl to lock the gearset 405 in a particular position. The pawl can be, for example, similar to a parking pawl in an automotive transmission. In this manner the slag door 105 can be locked in many positions limited only by the number of teeth on the gearset 405 and the gear ratio thereof (i.e., a numerically higher gear ratio provides a higher number of possible "park" positions). In some embodiments, the motors can have electrical, magnetic, or mechanical brakes. This can enable the slag door 105 to be parked in many positions, limited only by the resolution provided by the motors.

Referring back to FIG. 4, the slag door system 100 can further comprise a support system 125 comprising one or more uprights 415 to support the weight of the pivot 115 and the slag door 105. In some embodiments, the uprights 415 can be placed in front of the columns 184 of the furnace 102 to provide sufficient room for the slag door 105 and associated equipment. In other embodiments, the uprights 415 can be placed between the columns 184 to move the slag door 105 closer to the melt. The uprights 415 can comprise, for example and not limitation, steel girders of sufficient size to support the weight of the slag door 105 and the drive system 122. In an exemplary embodiment, the uprights 415 can be disposed on either side of the slag door 105, though other configurations are contemplated. In some embodiments, a portion of the wing walls 110 can also be attached to and supported by the uprights 415. In other embodiments, the system 100 can be mounted directly to the furnace columns 184 obviating the need for separate uprights 415.

Embodiments of the present invention provide a slag door system 100 that can be installed on new furnaces 102, or can be retrofitted to existing furnaces 102 to improve efficiency. Due to the relatively modular nature of the slag door system 100, the method for installing the slag door system 100 is much the same regardless of whether the installation is a retrofit or new construction (i.e., after the old slag door system has been removed in a retrofit). One or more uprights 415 can be placed on either side of the furnace opening. In some embodiments, the pivot 115 can then be pivotally coupled to the uprights 415 and then the slag door 105 can be coupled to the pivot 115. In other embodiments, it may be advantageous to manufacture the slag door 105 and the pivot 115 as a unit.

With the slag door 105 and pivot 115 in place, the drive system 122 can be installed. As mentioned above, the drive system 122 can pivot the door between the open and closed positions and can stop the door in many positions between the open and closed positions. The wing walls 110 can be installed such that they substantially abut the sidewall 380 of the furnace 102. In addition, the wing walls 110 can be disposed parallel to the plane created by the rotation of the edges of the slag door 105, such that they substantially abut the sides of the slag door 105. In other words, the wing walls 110 can be perpendicular to the door and can substantially seal against the sides of the slag door 105 regardless of the position of the slag door 105.

Once installed, in some embodiments, the slag door system 100 can utilize existing furnace cooling systems by tapping into, for example and not limitation, nearby sidewall cooling systems. In other embodiments, e.g., when there is no excess capacity on existing cooling systems, the slag door system 100 can utilize a stand alone cooling system.

In operation, the slag door 105 can be positioned and/or locked in the closed position. The furnace 102 can then be charged with scrap using a suitable method. Charging is normally done by first raising and pivoting the roof of the furnace 102, including the electrodes, away from the furnace to open the roof. Scrap is then dropped into the furnace 102 from a bucket on a large overhead crane. The roof of the furnace 102 is then pivoted back into place and lowered on the furnace 102 sidewalls 380. The electrodes can then be energized to begin the melt process. After charging, any scrap that is positioned against or near the slag door 105 can be quickly preheated and melted down using a burner 170 (if equipped), in addition to the electrical energy in the EAF.

In addition, because the slag door 105 can be substantially sealed against the wing walls 110 and the breast 113 or threshold 130, even when partially open, the slag door 105 is capable of containing slag in the furnace 102 even when the slag level exceeds the sill line 112 of the furnace 102. This can enable the furnace 102 to run at higher efficiency and can enable a sufficient foamy slag layer to be formed above the melt for efficient electrode operation.

Because the slag door 105 is located in close proximity to the hearth of the furnace 102, the traditional slag door tunnel is eliminated. This prevents the build up of slag and other debris in the tunnel which must be cleared to gain access to the melt. The slag door 105 is preferably located on the breast 113 of the furnace 102 at the highest point of the sill 112. In this manner, slag and debris tends to run away from the slag door 105 in either direction. This can further prevent slag and debris from interfering with the operation of the slag door 105.

After the melt cycle is complete and the scrap burden has been reduced to a liquid, the slag door 105 can be partially opened and the slag can be poured off the top of the melt by opening the slag door 105 and/or tilting the furnace 102. During this process, the slag door 105 can be used to control the flow of material out of the furnace 102. Because the wing walls 110 substantially abut the sides of the slag door 105, the wing walls 110 prevent excessive amounts of air from entering the furnace 102. This, in turn, prevents excessive amounts of heat loss from outside air entering the furnace 102 and exiting through, for example, the exhaust system of the furnace 102. And because the slag door 105 can be opened just far enough to pour off and control the slag, the size of the opening created is minimized. This can maintain a higher temperature in the furnace 102, save energy, and enable the flow of slag to be controlled with the slag door 105.

As mentioned above, the wing walls can also be configured to conform to the profile of the breast 113 and/or the threshold 130 of the slag door 105. This can enable the wing walls 110 to direct slag (during the deslagging process) into a confined pouring area, such as a slag pot. This can prevent spills and splashes of slag that represent both a waste of materials and hazards to furnace operators. The slag door 105 can also be used to direct and restrict the flow of material out of the furnace 102 during deslagging by setting the gap between the breast 113 of the furnace 102 and the bottom of the slag door 105.

After pouring off the slag, there is often residue left on the threshold 130 of the furnace 102. Conventionally, this could prevent the slag door(s) from closing. In other words, slag build-up on the threshold 130 could hit the bottom of the door and prevent the door from closing. This often caused furnace operation to be delayed so that the slag door area could be cleaned manually, with a pushing or pulling ram, or with other equipment.

Embodiments of the present invention, however, provide at least three solutions to this ubiquitous problem. The first solution is that the slag door 105 may be positioned at the top 112 of the breast 113. In this location, slag and debris tend to run naturally away from the slag door 105, i.e., back into or out of the furnace 102. The second solution is that the slag door 105 can be rotated into a position that enables the burner 170 to be activated to melt and/or burn any slag and/or debris off the threshold 130. Once reheated, the slag can simply run down the threshold 130 into a designated container or back into the furnace 102. This enables the breast 113 to be substantially cleaned with minimal delay. This represents a substantially savings in both cost and production time.

The third solution, as shown in FIG. 2c, is that the slag door 105 can simply be lowered until the bottom of the slag door 105 contacts the slag 250. Due to its design, the remaining gap between the sides of the slag door 105 and the sidewall 380 of the furnace 102 is occupied by the wing walls 110. This leaves only a slight gap between the bottom of the slag door 105 and the breast 113 of the furnace 102 due to the debris 250. In this manner, the slag door 105, while not completely closed, is nonetheless substantially sealed. With the slag door 105 in this position, the furnace 102 can continue in operation until a subsequent pour clears the debris, the threshold can be cleaned (e.g., with the burner 170), or until a scheduled downtime for maintenance and/or cleaning.

This saves tremendous amounts of energy because the furnace 102 can be substantially sealed with the slag door 105 in a partially open position. In addition, the furnace 102 can continue to operate, instead of having to shut down, clean the slag door area, and then restart the furnace 102. This reduces downtime and increases the efficiency of the furnace 102. Maintenance frequency and cost of cleaning are also reduced and can be limited to times allotted for scheduled maintenance.

The ability to open the slag door 105 and stop it in many positions between the open and closed position enables improved access to the furnace 102 and improves efficiency. In addition, the use of wing walls 110 to substantially abut the sides of the slag door 105 reduces heat transfer and improves the safety and efficiency of the furnace 102. The robust drive system 122 can enable the door to be opened and closed efficiently, to be parked in a variety of positions and, in some embodiments, locked in place. The design enables, among other things, reduced maintenance costs and reduced furnace 102 downtime.

While several possible embodiments are disclosed above, embodiments of the present invention are not so limited. For instance, while embodiments of the present invention have been disclosed with respect to a slag door 105 with a hydraulic cylinder driven rack and pinion type drive system 122, other methods could be used, such as for example and not limitation, a system utilizing direct hydraulic cylinders or electric or hydraulic motors with reduction gears, without deviating from the spirit of the invention. In addition, the location and configuration used for various features of embodiments of the present invention can be varied according to a particular furnace design that requires a slight variation due to, for example, space and/or power constraints. Such changes are intended to be embraced within the scope of the invention.

From the forgoing, it can be seen that embodiments of the present invention relate to a slag door system 100 for providing a slag door 105 for metallurgical furnaces 102 that can be retrofitted to existing furnaces or installed on new furnaces. The slag door system 100 provides a water-cooled slag door 105 flanked by one or more wing walls 110 that can be placed in close proximity to the hearth of the furnace 102. The close proximity reduces or eliminates areas in which slag or other debris can accumulate and block the slag door 105. The wing walls 110 are disposed in close proximity to the sides of the slag door 105 to minimize heat transfer when the slag door 105 is open or partially open. The slag door system 100 further comprises a drive system 122 capable of opening the slag door 105 and stopping and/or locking it in position at a variety of angles. As a result, the slag door 105 can be opened to an appropriate angle for the job at hand (e.g., deslagging, sampling, or maintenance) while minimizing heat transfer.

The specific configurations, choice of materials, and the size and shape of various elements can be varied according to particular design specifications or constraints requiring a device, system, or method constructed according to the principles of the invention. Such changes are intended to be embraced within the scope of the invention. The presently disclosed embodiments, therefore, are considered in all respects to be illustrative and not restrictive. The scope of the invention is indicated by the appended claims, rather than the foregoing description, and all changes that come within the meaning and range of equivalents thereof are intended to be embraced therein.

What is claimed is:

1. A slag door system for a metallurgical furnace comprising:
   a slag door assembly, with a top, a bottom, a left side, and a right side, the slag door assembly outwardly pivoting from the top between a first position and a second position; and
   one or more wing walls, each disposed in close proximity to the sides of the slag door assembly and substantially parallel to a plane defined by the right or left side of the slag door assembly as the slag door pivots from the first position to the second position, the one or more wing walls extending outward from a sidewall of the furnace and disposed in close proximity to a threshold of the furnace such that the one or more wing walls substantially occupy the gap between the left or right side of the slag door and the furnace when the slag door is between the first position and the second position to reduce air infiltration into, and heat loss from, the furnace.

2. The slag door system of claim 1,
wherein the slag door assembly is substantially vertical in the first position, such that it substantially occupies an opening in the sidewall of the furnace, and
wherein the slag door assembly is substantially horizontal in the second position, to provide access to the furnace.

3. The slag door system of claim 1, further comprising:
one or more drive mechanisms for pivoting the slag door assembly between the first position and the second position;
wherein each drive mechanism comprises:
  a hydraulic cylinder comprising a cylinder piston;
  a rack gear coupled to the cylinder piston; and
  a pinion gear, coupled to a pivot on the slag door assembly, and engaged with the rack gear.

4. The slag door system of claim 3, wherein each drive mechanism further comprises:
a counter-balance valve for hydraulically locking the hydraulic cylinder to hold the slag door in any position between and including the first position and the second position.

5. The slag door system of claim 1, further comprising:
one or more drive mechanisms for pivoting the door between the first position and the second position;
wherein each drive mechanism comprises:
  a hydraulic or electric motor with a drive shaft;
  a drive gear disposed on the driveshaft of the hydraulic or electric motor;
  a pinion gear, coupled to a pivot on the slag door assembly; and
  a gear reduction unit disposed between, and engaged with, the drive gear and the pinion gear for increasing the torque supplied by the hydraulic or electric motor to the pinion gear.

6. The slag door system of claim 1, further comprising a furnace apparatus comprising one or more of a burner, an oxygen lance, and a particle injector.

7. The slag door system of claim 6, wherein the furnace apparatus is mounted at an angle of between 10 degrees and 60 degrees from horizontal when the slag door assembly is in the first position.

8. The slag door system of claim 1, wherein one or more of the wing walls and the slag door assembly are liquid cooled.

9. The slag door system of claim 1, the slag door assembly further comprising:
an upper panel and a lower panel;
wherein the upper panel and the lower panel can be replaced separately to minimize repair and maintenance costs; and
wherein at least the lower panel is liquid cooled, heat resistant, or a combination of both to enable retention of up to about 18 inches of slag against the slag door.

10. The slag door system of claim 9, wherein the lower panel comprises:
a block of material with a high heat transfer coefficient; and
one or more coolant passages disposed throughout the block.

11. The slag door system of claim 1, wherein one or more portions of the wing walls and the slag door assembly comprise a material with a high heat transfer coefficient to minimize the adhesion of slag thereto.

12. The slag door system of claim 1, the slag door assembly further comprising:
an upper panel and a lower panel;
wherein the upper panel and the lower panel can be replaced separately to minimize repair and maintenance costs; and
wherein at least the lower panel is liquid cooled, heat resistant, or a combination of both to enable retention of slag against the slag door up to about one-third of the height of the slag door.

13. A system for providing access to a metallurgical furnace having a superstructure, a sidewall, a doorway, and a threshold, the system comprising:
a unitary slag door assembly, comprising a top side, bottom side, left side, and right side, the top side mounted proximate to the doorway of the furnace, the unitary slag door assembly pivotable in one direction as a unit between:
  a first, closed position for sealing the doorway of the furnace;
  a second, partially open position for providing partial access to the furnace; and
  a third, fully open position for providing full access to the furnace;
a first wing wall extending outward from the sidewall of the furnace and disposed substantially parallel to a plane defined by the right side of the slag door assembly as the slag door pivots from the first position to the second position; and
a second wing wall extending outward from the sidewall of the furnace and disposed substantially parallel to a plane defined by the left side of the slag door assembly as the slag door pivots from the first position to the second position;
wherein the first wing wall is disposed in close proximity to the right side of the slag door to occupy the space between the slag door and the furnace when the slag door is in the second position to reduce air infiltration into, and heat loss from, the furnace;
wherein the second wing wall is disposed in close proximity to the left side of the slag door to occupy the space between the slag door and the furnace when the slag door is in the second position to reduce air infiltration into, and heat loss from, the furnace; and
wherein the bottom side of the slag door assembly is disposed proximate to the threshold of the furnace in the first position to substantially occupy the doorway of the furnace.

14. The system of claim 13, wherein the slag door system is mounted to the superstructure of the metallurgical furnace.

15. The system of claim 13, further comprising:
two or more uprights, attached to one or more of the superstructure, threshold, and sidewall, for supporting the slag door system.

16. The system of claim 13, further comprising:
one or more hydraulic cylinders, coupled on a first end to the slag door assembly and on a second end to a fixed point proximate the slag door assembly for pivoting the slag door assembly between the first and third position; and
one or more hydraulic counterbalance valves for locking the slag door assembly in any position between and including the first position and the third position.

17. The system of claim 13, wherein the bottom side of the slag door assembly is disposed proximate to slag or debris on the threshold of the furnace in a fourth, partially closed position to reduce air infiltration into, and heat loss from, the furnace.

18. A slag door system for a metallurgical furnace comprising:
a unitary slag door assembly, with a top, a bottom, a left side, and a right side, the unitary slag door assembly outwardly pivoting about a single rotational axis located proximate to the top of the slag door assembly; and one or more wing walls extending outward from a sidewall of the furnace, each disposed in close proximty to the sides of the slag door assembly and substantially parallel to a plane defined by the right or left side of the slag door assembly as the slag door pivots from a first position to a second position, such that the one or more wing walls substantially occupy the gap between the left or right side of the slag door and the furnace when the slag door is between the first position and the second position to reduce air infiltration into, and heat loss from, the furnace.

19. The slag door system of claim 18, further comprising:
one or more drive mechanisms for pivoting the slag door assembly between a first position and a second position; and
a valve for hydraulically locking a least one drive mechanism to hold the slag door in any position between and including the first position and the second position.

20. The slag door system of claim 18, further comprising a furnace apparatus comprising one or more of a burner, an oxygen lance, and a particle injector.

* * * * *